United States Patent
Ozawa et al.

(10) Patent No.: US 9,950,493 B2
(45) Date of Patent: Apr. 24, 2018

(54) DECORATIVE FILM

(71) Applicants: TOYODA GOSEI CO., LTD., Kiyosu-shi, Aichi-ken (JP); NISSHA PRINTING CO., LTD., Kyoto-shi, Kyoto (JP)

(72) Inventors: Etsuo Ozawa, Kiyosu (JP); Tatsuo Ito, Kiyosu (JP); Ryouki Kubomoto, Kyoto (JP)

(73) Assignees: TOYODA GOSEI CO., LTD., Aichi-pref. (JP); NISSHA PRINTING CO., LTD., Kyoto (JP)

( * ) Notice: Subject to any disclaimer, the term of this patent is extended or adjusted under 35 U.S.C. 154(b) by 252 days.

(21) Appl. No.: 14/875,931

(22) Filed: Oct. 6, 2015

(65) Prior Publication Data

US 2016/0101589 A1 Apr. 14, 2016

(30) Foreign Application Priority Data

Oct. 9, 2014 (JP) ................................ 2014-208020

(51) Int. Cl.
*B32B 3/30* (2006.01)
*B32B 27/08* (2006.01)
(Continued)

(52) U.S. Cl.
CPC ................ *B32B 3/30* (2013.01); *B32B 27/08* (2013.01); *B32B 27/20* (2013.01); *B32B 27/302* (2013.01);
(Continued)

(58) Field of Classification Search
CPC ... B32B 3/30; B32B 2307/41; B32B 2451/00; B32B 2605/003; B32B 2307/402; Y10T 428/24612; Y10T 428/24537
See application file for complete search history.

(56) References Cited

U.S. PATENT DOCUMENTS 5,270,097 A * 12/1993 Amemiya ................ B41M 3/06
428/151
6,544,369 B1 * 4/2003 Kitamura ................ B32B 15/08
156/230

FOREIGN PATENT DOCUMENTS

JP H06-286094 A 10/1994
JP 2013-132820 A 7/2013

OTHER PUBLICATIONS

Office Action dated Sep. 26, 2017 issued in corresponding JP application No. 2014-208020 (and English translation).

* cited by examiner

*Primary Examiner* — Donald J Loney
(74) *Attorney, Agent, or Firm* — Posz Law Group, PLC

(57) ABSTRACT

A decorative film includes a dark-colored opaque substrate, which includes a surface that includes an uneven section, and a transparent decorative layer, which is stacked on the surface of the opaque substrate and closely contacts the uneven section. The uneven section includes ridges and grooves, which are located between the ridges. The ridges extend in directions of the same tendency, and the grooves extend in directions of the same tendency as the ridges. A minute uneven section formed in the top surface of each ridge includes minute ridges and minute grooves, which are located between the minute ridges. The minute ridges extend in directions of the same tendency and have a narrower width than the ridges and the grooves, and the minute grooves extend in directions of the same tendency as the minute ridges and have a narrower width than the ridges and the grooves.

5 Claims, 3 Drawing Sheets

(51) Int. Cl.
    *B32B 27/20*          (2006.01)
    *B32B 27/30*          (2006.01)
    *B32B 27/32*          (2006.01)

(52) U.S. Cl.
    CPC ............ *B32B 27/308* (2013.01); *B32B 27/32* (2013.01); *B32B 2250/24* (2013.01); *B32B 2307/40* (2013.01); *B32B 2307/402* (2013.01); *B32B 2307/4026* (2013.01); *B32B 2307/41* (2013.01); *B32B 2307/412* (2013.01); *B32B 2451/00* (2013.01); *B32B 2457/00* (2013.01); *B32B 2509/00* (2013.01); *B32B 2605/00* (2013.01); *B32B 2605/003* (2013.01); *Y10T 428/24537* (2015.01); *Y10T 428/24612* (2015.01)

Fig.2A
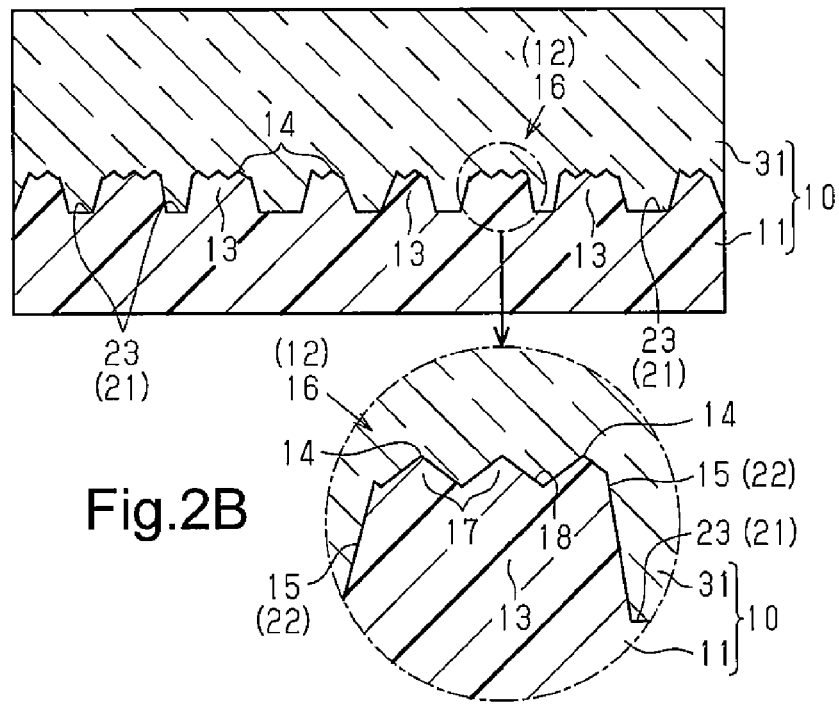
Fig.2B
Fig.3A
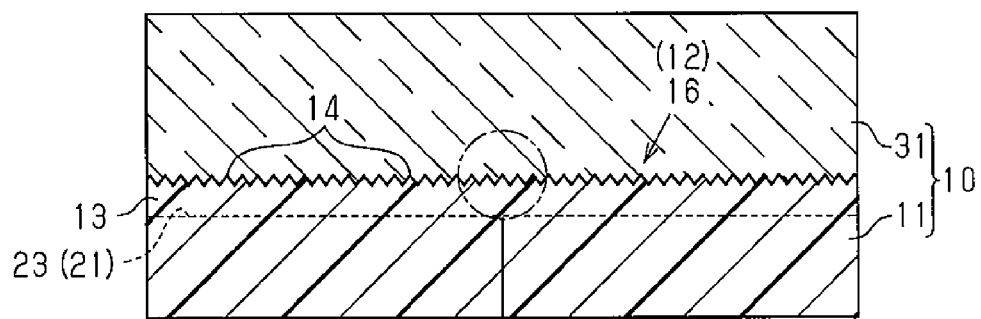
Fig.3B

DECORATIVE FILM

BACKGROUND OF THE INVENTION

The present invention relates to a decorative film that is used as a surface layer of an interior part of a vehicle to decorate the interior part.

Some vehicle interior parts have decorative films as surface layers. FIG. 5 shows an example of a decorative film that includes an opaque substrate 51 and a transparent decorative layer 57. The opaque substrate 51 includes an uneven section 52 on the surface. The transparent decorative layer 57 is stacked on the surface (the upper side as viewed in FIG. 5) of the opaque substrate 51 and closely contacts the uneven section 52.

The uneven section 52 typically includes projections 53, each having a square flat top surface 54, and depressions 55, each having a square flat bottom surface 56. The projections 53 and the depressions 55 are arranged alternately. With the decorative film 50, a portion of the light that is incident on the transparent decorative layer 57 from the surface side of the decorative film 50 is reflected from the top surfaces 54 of the projections 53, and another portion of the light is reflected from the bottom surfaces 56 of the depressions 55, which are at a greater depth than the top surfaces 54. Thus, the top surfaces 54 and the bottom surfaces 56 are perceived as three-dimensional patterns of two types of squares that are arranged alternately below the surface of the decorative film 50. This improves the texture of the interior part.

Examples of the related art include Japanese Laid-Open Patent Publication No. 2013-132820, which describes a decorative sheet that includes a transparent print layer and a colored print layer.

The three-dimensional appearance of patterns described above is achieved effectively when the opaque substrate 51 has a light color. This is because the large difference in the light reflection characteristics, such as reflection directions, between the top surfaces 54 and the bottom surfaces 56 clarifies the difference in shading.

On the other hand, the patterns of the top surfaces 54 and the bottom surfaces 56 are perceived to be located at a greater depth from the surface of the decorative film 50 when the opaque substrate 51 has a dark color instead of a light color. However, when a dark color is used for the opaque substrate 51, which forms simple patterns in which square flat top surfaces 54 and square flat bottom surfaces 56 are arranged alternately, the difference in shading between the pattern of the top surfaces 54 and the pattern of the bottom surfaces 56 is not clear. This disadvantageously results in the patterns perceived as having the same dark color.

SUMMARY OF THE INVENTION

Accordingly, it is an objective of the present invention to provide a decorative film in which the patterns of top surfaces and bottom surfaces of an uneven section are three-dimensionally perceived to be located at greater depths.

To achieve the foregoing objective and in accordance with one aspect of the present invention, a decorative film is provided that includes a dark-colored opaque substrate, which has a surface that includes an uneven section, and a transparent decorative layer, which is stacked on the surface of the opaque substrate and closely contacts the uneven section. The uneven section includes a plurality of ridges, which extend in directions of the same tendency, and a plurality of grooves, which are each located between adjacent ones of the ridges and extend in directions of the same tendency as the ridges. Each ridge has a top surface, which includes a minute uneven section. The minute uneven section includes a plurality of minute ridges, which extend in directions of the same tendency and have a narrower width than the ridges and the grooves, and a plurality of minute grooves, which are each located between adjacent ones of the minute ridges and extend in a direction of the same tendency as the minute ridges and have a narrower width than the ridges and the grooves.

In the configuration described above, a portion of the light that is incident on the transparent decorative layer from the surface side of the decorative film is reflected from the top surfaces of the ridges, and another portion of the light is reflected from the bottom surfaces of the grooves, which are located at a greater depth than the top surfaces.

Since the opaque substrate has a dark color, the patterns are perceived to be located at a greater depth from the surface of the decorative film than when the opaque substrate has a light color. However, when the opaque substrate of a dark color has simple patterns of square flat top surfaces and square flat bottom surfaces that are arranged alternately, the difference in shading between the pattern of the top surfaces and the pattern of the bottom surfaces is not clear. This disadvantageously results in the patterns perceived as having the same dark color.

In this respect, the uneven section of the structure described above includes a plurality of ridges and a plurality of grooves. The ridges and the grooves are elongated. In addition, the top surface of each ridge, which is located at a lesser depth than the bottom surfaces of the grooves, includes a minute uneven section that includes a plurality of minute ridges and a plurality of minute grooves. Thus, a portion of the light that is incident on the transparent decorative layer and reaches the top surfaces of the ridges strikes and is reflected from the minute ridges, and another portion of the light strikes the minute grooves and is reflected with reflection characteristics that differ from those on the minute ridges. Accordingly, the light that reaches the top surfaces of the ridges is reflected with different reflection characteristics. Therefore, the difference in shading between the pattern of the top surfaces and the pattern of the bottom surfaces is clarified, and the three-dimensional appearance of the patterns is enhanced.

BRIEF DESCRIPTION OF THE DRAWINGS

FIG. 2A is a vertical cross-sectional view of the decorative film taken along a plane perpendicular to the direction in which ridges extend;

FIG. 2B is an enlarged vertical cross-sectional view showing a part in FIG. 2A;

FIG. 3A is a vertical cross-sectional view of the decorative film taken along a plane in the direction in which the ridges extend;

FIG. 3B is a vertical cross-sectional view showing a part in FIG. 3A;

DETAILED DESCRIPTION OF THE PREFERRED EMBODIMENTS

Referring to FIGS. 1, 2A, 2B, 3A and 3B, a decorative film 10 according to one embodiment will now be described.

Figure 1:
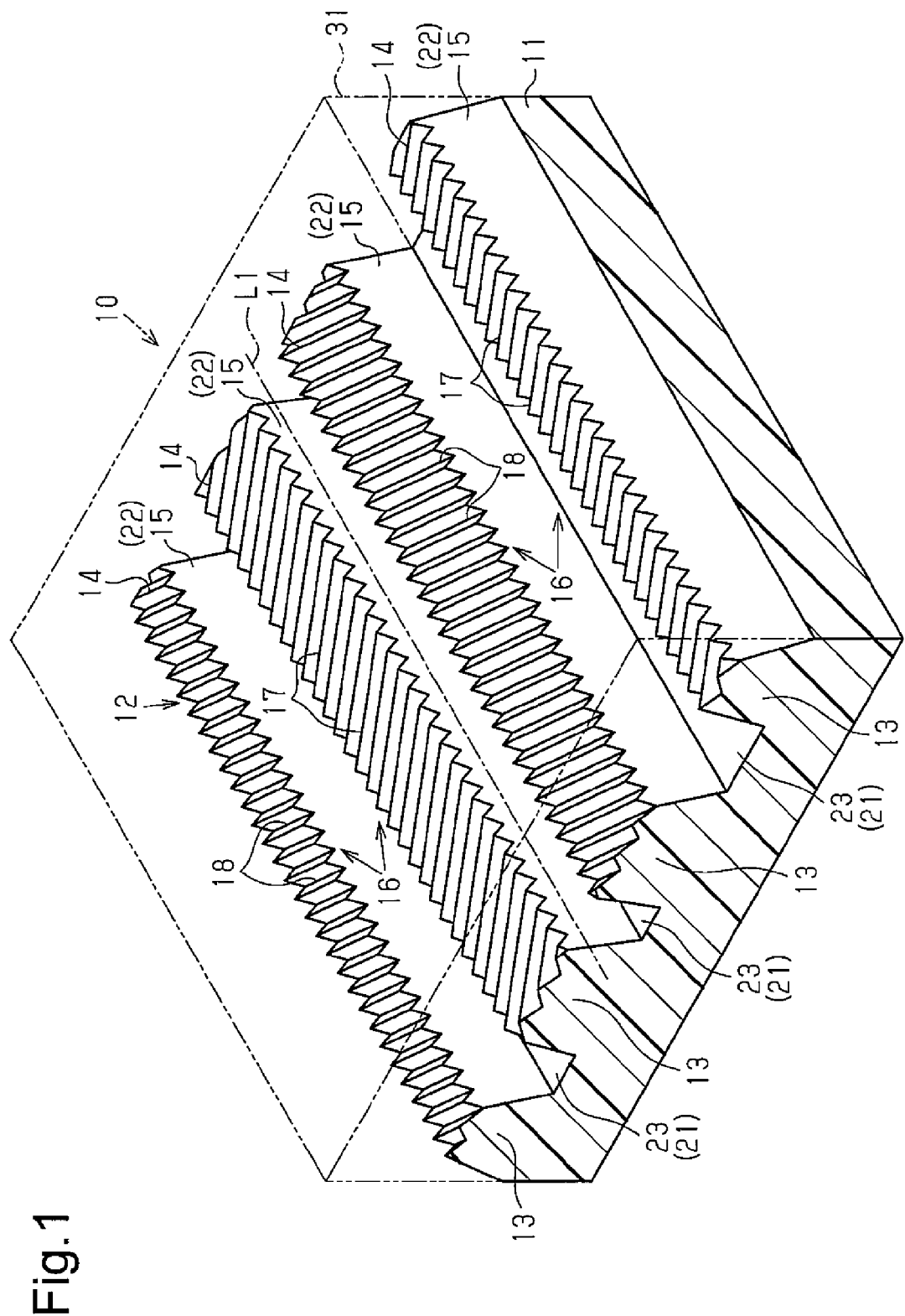
FIG. 1 is an enlarged perspective view showing a part of a decorative film of one embodiment.

As shown in FIG. 1, the decorative film 10 is used as a surface layer of a vehicle interior part, such as a console upper panel or a center cluster panel, to decorate the part.

The decorative film 10 includes an opaque substrate 11 and a transparent decorative layer 31. The opaque substrate 11 is formed mainly of acrylonitrile butadiene styrene (ABS) resin. A coloring agent dispersed in the opaque substrate 11 colors the opaque substrate 11 black, which is a dark color. The surface of the opaque substrate 11, that is, the upper surface as viewed in FIG. 1, includes an uneven section 12 formed by embossing. To form the uneven section 12, the rolled opaque substrate 11 is heated when being unrolled and fed. The opaque substrate 11, which has been softened by the heat, is then pressed with an embossing die, forming the uneven section 12 in the surface of the opaque substrate 11.

The opaque substrate 11 may be formed of a single film or a plurality of layered films.

As shown in FIGS. 1 and 2A, the uneven section 12 includes a plurality of ridges 13 and a plurality of grooves 21. The ridges 13 are separated from one another and extended in directions of the same tendency. The term "in directions of the same tendency" refers to "in substantially the same direction." The grooves 21 are each located between adjacent ones of the ridges 13 and extended in directions of the same tendency as the ridges 13. The average distance between top surfaces 14 of the ridges 13 and bottom surfaces 23 of the grooves 21 is 60 μm.

As shown in FIGS. 1 and 2B, each ridge 13 includes two outer surfaces 15, and each groove 21 includes two inner surfaces 22. An outer surface 15 of one ridge 13 and an inner surface 22 of an adjacent groove 21 is a common flat surface. One of the outer surfaces 15 of each ridge 13 is inclined such that the distance from the other outer surface 15 decreases toward the surface side (the upper side as viewed in FIG. 1). That is, one of the inner surfaces 22 of each groove 21 is inclined such that the distance from the other inner surface 22 increases toward the surface side.

The cross-sectional shapes of the ridges 13 may be identical or vary. The cross-sectional shape of each ridge 13 may be uniform over the entire length or vary along the length.

Likewise, the cross-sectional shapes of the grooves 21 may be identical or vary. The cross-sectional shape of each groove 21 may be uniform over the entire length or vary along the length.

In the present embodiment, the ridges 13 and the grooves 21 are equivalent in width and height.

Figure 5:
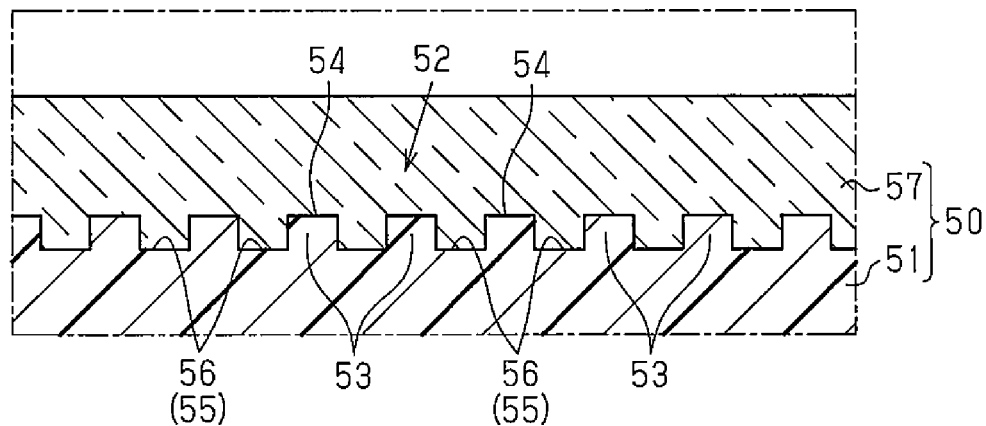
FIG. 5 is a partial cross-sectional view showing a conventional decorative film.

In a similar manner as the bottom surface 56 of the uneven section 52 in the conventional decorative film 50 (FIG. 5), the bottom surface 23 of each groove 21 is flat. In contrast, the top surface 14 of each ridge 13 includes a minute uneven section 16 as shown in FIGS. 1, 2A and 3A. Due to this minute uneven section 16, the top surface 14 of the ridge 13 has an uneven shape and thus differs from the top surface 54 of the uneven section 52 in the conventional decorative film 50 (FIG. 5).

As shown in FIGS. 1, 2B and 3B, the minute uneven section 16 of the top surface 14 of each ridge 13 includes a plurality of minute ridges 17 and a plurality of minute grooves 18. The minute ridges 17 have a triangular cross-section and extend in directions of the same tendency, for example in directions that intersect the directions in which the ridges 13 extend. The minute grooves 18 have a triangular cross-section, are each located between adjacent ones of the minute ridges 17, and extend in directions of the same tendency as the minute ridges 17. The minute ridges 17 have a narrower width than the ridges 13 and the grooves 21. Likewise, the minute grooves 18 have a narrower width than the ridges 13 and the grooves 21. The minute ridges 17 and the minute grooves 18 are equivalent in width.

As shown in FIG. 1, the minute ridges 17 of a given ridge 13 extend in directions that differ from the directions in which the minute ridges 17 of an adjacent ridge 13 extend. This also applies to the minute grooves 18, which extend in directions of the same tendency as the minute ridges 17. The minute ridges 17 (the minute grooves 18) of the minute uneven section 16 of a given ridge 13 and the minute ridges 17 (the minute grooves 18) of the minute uneven section 16 of an adjacent ridge 13 exhibit line symmetry with respect to an imaginary line L1 extending along the ridges 13 (the grooves 21). In other words, the minute ridges 17 (the minute grooves 18) in the minute uneven sections 16 of alternate ridges 13 extend in the same direction.

As shown in FIGS. 2A, 2B, 3A and 3B, the transparent decorative layer 31 is a film made of a transparent resin material, such as polymethyl methacrylate (PMMA), which is an acrylate resin. The transparent resin material includes a colored transparent material as well as a colorless transparent material. The transparent decorative layer 31 is stacked on the surface of the opaque substrate 11 and closely contacts the uneven section 12.

The color difference of the decorative film 10 of the present embodiment, which is configured as described above, was measured using a spectrophotometer. The measurement showed that the decorative film 10 had an average lightness L* of 30.5, an average chromaticity a* of −0.3, and an average chromaticity b* of 0.0. The gloss of the decorative film 10 of the present embodiment that was measured with a glossmeter at 60° was 80.1.

The decorative film 10 is used when forming an interior part by film insert molding. The film insert molding is a resin molding method in which the decorative film 10 is placed in a mold, and then a molten resin material is introduced under pressure into the mold. The resin material is cooled and hardened so that the decorative film 10 and the resin material are integrated. This forms the desired interior part.

Operation of the decorative film 10 will now be described.

A portion of the light that is incident on the transparent decorative layer 31 from the surface side of the decorative film 10 is reflected from the top surfaces 14 of the ridges 13, and another portion of the light is reflected from the bottom surfaces 23 of the grooves 21, which are located at a greater depth than the top surfaces 14.

Since the opaque substrate 11 has a dark color, the patterns formed by the top surfaces 14 and the bottom surfaces 23 are perceived to be located at a greater depth from the surface of the decorative film 10 than when the opaque substrate 11 has a light color. Such an effect is greater when the opaque substrate 11 has a black color compared to other dark colors.

However, when the opaque substrate 11 has a dark color and simple patterns, such as when square flat top surfaces 54 and square flat bottom surface 56 are arranged alternately, the difference in shading between the pattern of the top surfaces 54 and the pattern of the bottom surfaces 56 is not clear. The patterns are perceived as having the same dark color.

In this respect, the uneven section 12 of the present embodiment includes a plurality of the ridges 13 and a plurality of the grooves 21, which are elongated. In addition, the top surface 14 of each ridge 13, which is located at a lesser depth than the bottom surfaces 23 of the grooves 21, includes the minute uneven section 16, which is formed by a plurality of minute ridges 17 and a plurality of minute grooves 18.

Thus, a portion of the light that is incident on the transparent decorative layer 31 and reaches the top surfaces 14 of the ridges 13 strikes and is reflected from the minute ridges 17, and another portion of the light strikes the minute grooves 18 and is reflected with reflection characteristics (e.g., directions) that differ from those of the light reflected from the minute ridges 17. Accordingly, the light that strikes the top surfaces 14 of the ridges 13 is reflected with various reflection characteristics (e.g., directions). This clarifies the difference in shading between the pattern of the top surfaces 14 and the pattern of the bottom surfaces 23.

In particular, since the bottom surfaces 23 of the grooves 21 are flat, the light reflection characteristics (e.g., directions) on the bottom surfaces 23 significantly differ from the light reflection characteristics (e.g., directions) on the minute ridges 17 and the minute grooves 18 of the top surfaces 14. This further clarifies the difference in shading between the pattern of the top surfaces 14 and the pattern of the bottom surfaces 23.

Adjacent ridges 13 differ in the directions in which the minute ridges 17 (minute grooves 18) extend. Thus, the reflection characteristics (e.g., directions) on the minute ridges 17 (minute grooves 18) of a given ridge 13 differ from the reflection characteristic (e.g., directions) on the minute ridges 17 (minute grooves 18) of an adjacent ridge 13. This further clarifies the difference in shading of the patterns.

The above described embodiment achieves the following advantages.

(1) The decorative film 10 includes the dark-colored opaque substrate 11, which includes the uneven section 12, and the transparent decorative layer 31, which is stacked on the surface of the opaque substrate 11. The uneven section 12 includes a plurality of ridges 13 and a plurality of grooves 21. The top surface 14 of each ridge 13 includes the minute uneven section 16, which includes a plurality of minute ridges 17 and a plurality of minute grooves 18. The minute ridges 17 extend in directions of the same tendency and have a narrower width than the ridges 13 and the grooves 21. The minute grooves 18 are located between adjacent ones of the minute ridges 17, extend in directions of the same tendency as the minute ridges 17, and have a narrower width than the ridges 13 and the grooves 21 (FIG. 1).

Since the opaque substrate 11 has a dark color, and the minute uneven section 16, which includes the minute ridges 17 and the minute grooves 18, is formed in the top surface 14 of each ridge 13, the patterns of the top surfaces 14 and the bottom surfaces 23 in the uneven section 12 are perceived to be located at a greater depth from the surface of the decorative film 10 and to have a three-dimensional appearance. This adds a quality appearance to the decorative film 10.

(2) The bottom surface 23 of each groove 21 is flat (FIGS. 1 and 2A). This further clarifies the difference in shading between the pattern of the top surfaces 14 and the pattern of the bottom surfaces 23, enhancing the three-dimensional appearance of the patterns.

(3) The minute ridges 17 of a given ridge 13 extend in directions that differ from the directions in which the minute ridges 17 of an adjacent ridge 13 extend (FIG. 1). The ridges 13 that are adjacent to each other differ in the reflection characteristics (e.g., directions) on the minute ridges 17. This further clarifies the difference in shading between the pattern of the top surfaces 14 and the pattern of the bottom surfaces 23 and enhances their three-dimensional appearance.

(4) The opaque substrate 11 is colored in black. This maximizes the effect that the patterns of the top surfaces 14 and the bottom surfaces 23 are perceived to be located at a greater depth from the surface of the decorative film 10.

The above described embodiment may be modified as follows.

<Regarding the Opaque Substrate 11>

The opaque substrate 11 may have a dark color other than black, such as dark grey or navy blue.

<Regarding Ridges 13 and Grooves 21>

The ridges 13 and the grooves 21 may significantly differ in width.

The width and the height of each ridge 13 do not have to be uniform over the entire length of the ridge 13 and may change with a certain tendency. The width and the height of the ridge 13 may gradually increase or decrease along the length of the ridge 13, for example.

Likewise, the width and depth of each groove 21 do not have to be uniform over the entire length of the groove 21 and may change with a certain tendency. The width and depth of the groove 21 may gradually increase or decrease along the length of the groove 21, for example.

As long as a plurality of ridges 13 extends in directions of the same tendency, the ridges 13 do not have to extend exactly in the same direction. In other words, the ridges 13 do not have to be exactly parallel to one another.

Likewise, as long as a plurality of grooves 21 extends in directions of the same tendency, the grooves 21 do not have to extend exactly in the same direction. In other words, the grooves 21 do not have to be exactly parallel to one another.

<Regarding Minute Uneven Sections 16, Minute Ridges 17, and Minute Grooves 18>

Figure 4:
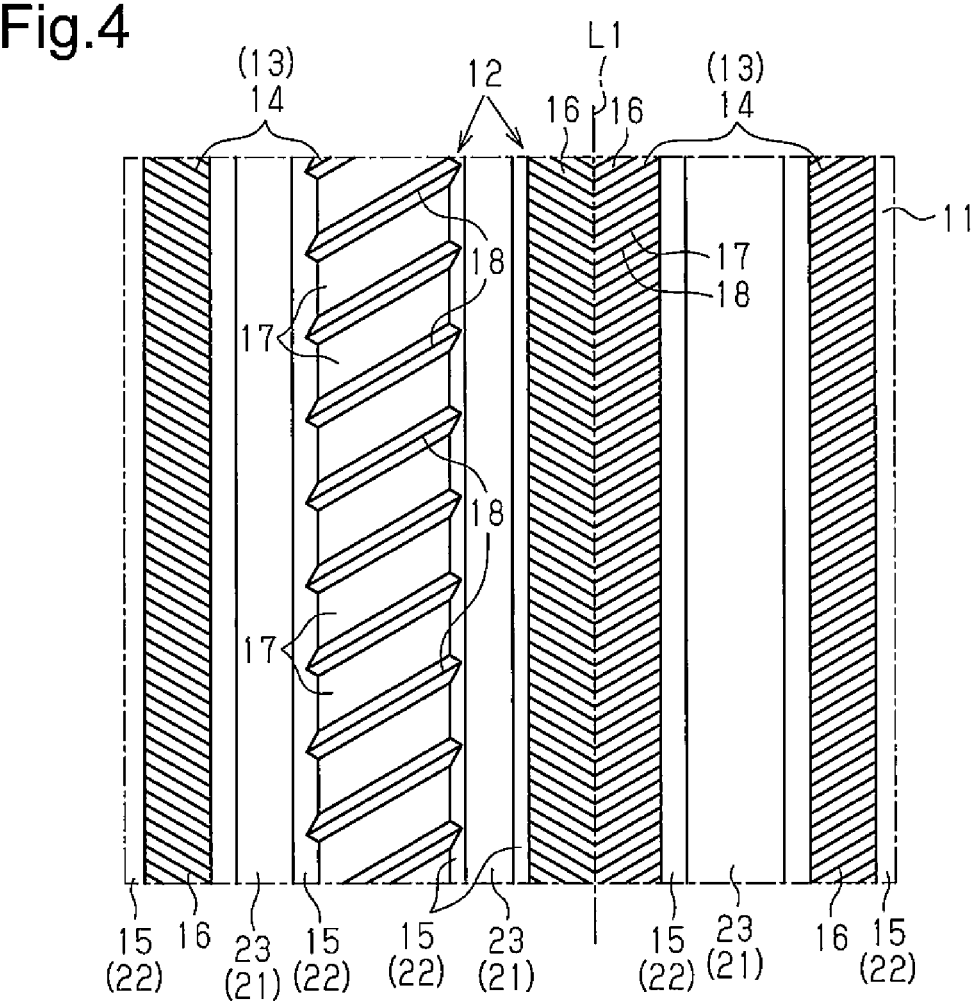
FIG. 4 is a partial plan view showing a modification of a minute uneven section of an opaque substrate.

The top surface 14 of one ridge 13 may include a plurality of minute uneven sections 16. FIG. 4 shows an example in which the top surface 14 of a certain ridge 13, the third from the left as viewed in FIG. 4, includes two minute uneven sections 16 arranged side-by-side. In this case, it is desirable that the minute ridges 17 (minute grooves 18) in one of the two adjacent minute uneven sections 16 extend in directions that differ from the directions in which the minute ridges 17 (minute grooves 18) in the other minute uneven section 16 extend. In the example shown in FIG. 4, the minute ridges 17 (minute grooves 18) in one of the adjacent minute uneven sections 16 and the minute ridges 17 (minute grooves 18) of the other minute uneven section 16 exhibit line symmetry with respect to an imaginary line L1.

Accordingly, the adjacent minute uneven sections 16 in the top surface 14 of the certain ridge 13, which is the third from the left as viewed in FIG. 4, differ in the directions in which the minute ridges 17 (minute grooves 18) extend. The reflection characteristics (e.g., directions) on the minute ridges 17 (minute grooves 18) in one of the adjacent minute uneven sections 16 differ from those on the minute ridges 17 (minute grooves 18) of the other minute uneven section 16. This further clarifies the difference in shading between the pattern of the top surfaces 14 and the pattern of the bottom surfaces 23 and enhances their three-dimensional appearance.

Further, although not shown in the drawings, one top surface 14 may include three or more minute uneven sections 16. In this case, as with the example described above, it is desirable that adjacent ones of the minute uneven sections 16 differ in the directions in which the minute ridges 17 (minute grooves 18) extend.

As shown in FIG. 4, in a certain ridge 13, the second from the left as viewed in FIG. 4, at least one end of the minute grooves 18 in the top surface 14 may be extended to enter an outer surface 15.

The width of the minute ridges 17 may be equivalent to the width of the minute grooves 18 as with the case of the present embodiment, or may significantly differ from the width of the minute grooves 18. In the ridge 13 that is the second from the left as viewed in FIG. 4, the minute ridges 17 have a greater width than the minute grooves 18.

Although not shown in the drawings, the minute ridges 17 and the minute grooves 18 in at least one ridge 13 may extend perpendicular to the direction in which the ridge 13 extends, or may extend in the same direction as the ridge 13.

The cross-sectional shape of the minute ridges 17 (minute grooves 18) may differ from the rectangular shape of the present embodiment.

<Application>

In addition to vehicle interior parts, the decorative film 10 may be used to decorate vehicle exterior parts.

In addition to vehicles, the decorative film 10 may be used for other applications, for example to decorate electric appliances, sundry items, and household goods.

The invention claimed is:

1. A decorative film comprising:
   a dark-colored opaque substrate, which has a surface that includes an uneven section; and
   a transparent decorative layer, which is stacked on the surface of the opaque substrate and closely contacts the uneven section, wherein
   the uneven section includes a plurality of ridges, which extend in directions of the same tendency, and a plurality of grooves, which are each located between adjacent ones of the ridges and extend in directions of the same tendency as the ridges,
   each ridge has a top surface, which includes a minute uneven section,
   the minute uneven section includes a plurality of minute ridges, which extend in directions of the same tendency and have a narrower width than the ridges and the grooves, and a plurality of minute grooves, which are each located between adjacent ones of the minute ridges and extend in a direction of the same tendency as the minute ridges and have a narrower width than the ridges and the grooves,
   the minute ridges extend in directions that intersect the directions in which the ridges extend, and
   the minute ridges and the minute grooves of the minute uneven section of a given ridge and the minute ridges and the minute grooves of the minute uneven section of an adjacent ridge exhibit line symmetry with respect to an imaginary line extending along the ridges and the grooves of the uneven section.

2. The decorative film according to claim 1, wherein each groove has a flat bottom surface.

3. The decorative film according to claim 1, wherein the minute ridges of a given one of the ridges extend in directions that differ from directions in which the minute ridges of one of the ridges that is adjacent to the given one of the ridges extend.

4. The decorative film according to claim 1, wherein
   the top surface of one of the ridges includes a plurality of the minute uneven sections, and
   the minute ridges of one of two adjacent ones of the plurality of the minute uneven sections extend in directions that differ from directions in which the minute ridges of the other one of the two adjacent ones of the plurality of the minute uneven sections extend.

5. The decorative film according to claim 1, wherein the opaque substrate is colored in black.

* * * * *